United States Patent
Yoo

(10) Patent No.: US 8,891,182 B2
(45) Date of Patent: Nov. 18, 2014

(54) WIDE ANGLE LENS AND PHOTOGRAPHING APPARATUS INCLUDING THE SAME

(71) Applicant: Samsung Techwin Co., Ltd., Changwon (KR)

(72) Inventor: Ji-yeong Yoo, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/914,829

(22) Filed: Jun. 11, 2013

(65) Prior Publication Data

US 2014/0029118 A1     Jan. 30, 2014

(30) Foreign Application Priority Data

Jul. 25, 2012   (KR) .......................... 10-2012-0081409

(51) Int. Cl.

| | |
|---|---|
| *G02B 13/04* | (2006.01) |
| *G02B 9/60* | (2006.01) |
| *G02B 13/00* | (2006.01) |
| *G02B 13/24* | (2006.01) |
| *G02B 13/18* | (2006.01) |

(52) U.S. Cl.
CPC ................ *G02B 13/004* (2013.01); *G02B 9/60* (2013.01); *G02B 13/18* (2013.01); *G02B 13/04* (2013.01); *G02B 13/24* (2013.01)
USPC .......................................................... 359/753

(58) Field of Classification Search
CPC .. G02B 13/004; G02B 13/0045; G02B 13/04; G02B 13/18; G02B 13/24; G02B 9/60
USPC .......................................... 359/714, 715, 753
See application file for complete search history.

(56) References Cited

U.S. PATENT DOCUMENTS

| | | | |
|---|---|---|---|
| 6,833,967 B2 | 12/2004 | Sekita | |
| 6,865,031 B2 | 3/2005 | Hoshi | |
| 7,903,348 B2 * | 3/2011 | Sensui | .......................... 359/794 |
| 8,054,562 B2 * | 11/2011 | Asami | .......................... 359/761 |
| 8,169,720 B2 | 5/2012 | Eguchi | |
| 8,248,715 B2 * | 8/2012 | Asami et al. | .................. 359/762 |
| 8,576,502 B2 * | 11/2013 | Chen et al. | .................... 359/770 |
| 2011/0080659 A1 | 4/2011 | Kurashige | |

FOREIGN PATENT DOCUMENTS

| | | | |
|---|---|---|---|
| JP | 10213742 A | 8/1998 | |
| JP | 2002303789 A | 10/2002 | |
| JP | 2003241084 A | 8/2003 | |
| JP | 3943988 B2 | 4/2007 | |
| JP | 2010134416 A | 6/2010 | |
| JP | 2010145828 A | 7/2010 | |
| JP | 201176021 A | 4/2011 | |
| JP | 4742465 B2 | 5/2011 | |
| WO | 2010071077 A1 | 6/2010 | |

* cited by examiner

*Primary Examiner* — David N Spector
(74) *Attorney, Agent, or Firm* — Sughrue Mion, PLLC

(57) ABSTRACT

Exemplary embodiments may disclose a wide angle lenses including: a first lens which has a negative refractive power; a second lens which has a positive refractive power; a third lens which has the positive refractive power; a fourth lens which has the negative refractive power; and a fifth lens which has the positive refractive power, wherein the first lens, the second lens, the third lens, the fourth lens, and the fifth lens are in an order from an object to an image, wherein the wide angle lenses satisfy a condition of $0.2 < f/BFL_{14} < 0.25$, wherein f denotes an overall effective focal length of the wide angle lenses and $BFL_{14}$ denotes a combined back focal length of the first lens through the fourth lens.

14 Claims, 16 Drawing Sheets

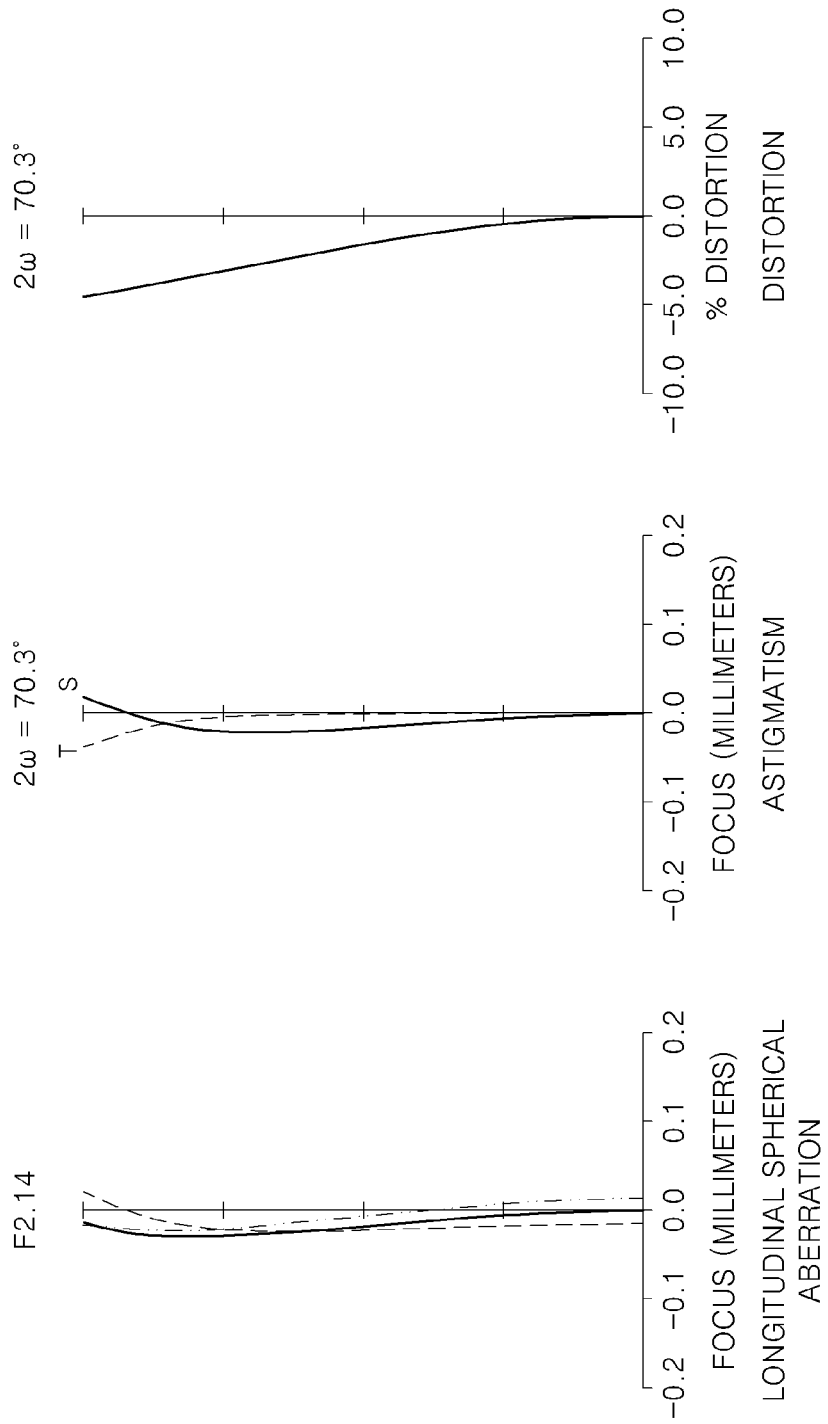

WIDE ANGLE LENS AND PHOTOGRAPHING APPARATUS INCLUDING THE SAME

CROSS-REFERENCE TO RELATED PATENT APPLICATION

This application claims priority from Korean Patent Application No. 10-2012-0081409, filed on Jul. 25, 2012, in the Korean Intellectual Property Office, the disclosure of which is incorporated herein in its entirety by reference.

BACKGROUND

1. Field

Exemplary embodiments relate to a wide angle lens and a photographing apparatus, including the wide angle lens. More particularly, exemplary embodiments relate to a wide angle lens having excellent short distance performance, high optical performance, and a lightweight focus group, and a photographing apparatus including the wide angle lens.

2. Description of the Related Art

A solid image capturing device of the related art, such as a charge-coupled device (CCD) or a complementary metal-oxide semiconductor (CMOS), may become small and realize a high pixel resolution. Further, according to user demand, a lens system included in an image forming device of the related art, such as a digital camera, a video camera, and a surveillance camera needs to have improved optical performance and become small.

The user demand is increasing for a wide viewing angle, a small size, and a high performance, short distance photographing. This user demand has been increasing for a lens system included in a video presenter and a microscope.

SUMMARY

Exemplary embodiments may provide a wide angle lens capable of being smaller than the related art, and having excellent short distance photographing performance, and a photographing apparatus including the wide angle lens.

Exemplary embodiments may also provide a rear focus wide angle lens for a lightweight focus group, and a photographing apparatus including the rear focus wide angle lens.

According to an aspect of the exemplary embodiments, there is provided a wide angle lenses including: a first lens which has a negative refractive power; a second lens which has a positive refractive power; a third lens which has the positive refractive power; a fourth lens which has the negative refractive power; and a fifth lens which has the positive refractive power, wherein the first lens, the second lens, the fourth lens, and the fifth lens are in an order from an object to an image, wherein the wide angle lenses satisfy a condition of $$0.2 < f/BFL_{14} < 0.25,$$

wherein f denotes an overall effective focal length of the wide angle lenses and $BFL_{14}$ denotes a combined back focal length of the first lens through the fourth lens.

The wide angle lenses may satisfy a condition of $$3.0 < f_{14}/f,$$

wherein $f_{14}$ denotes a combined focal length of the first lens through the fourth lens.

Focusing may be performed by moving the fifth lens in an optical axis direction.

The first lens through the fourth lens may be fixed.

The fifth lens may satisfy a condition of $$M_5 < 0.3,$$

wherein $M_5$ denotes a magnification of the fifth lens.

The fifth lens may satisfy a condition of $$Nd_5 > 1.8,$$

wherein $Nd_5$ denotes a refractive index of the fifth lens.

The fifth lens may include at least one aspheric surface.

A surface of the fifth lens, which is disposed on a side toward the object, may be the at least one aspheric surface.

The third lens and the fourth lens may form a cemented lens.

The first lens may be a meniscus lens having a convex surface on a side toward the object, the second lens may be the meniscus lens having the convex surface on a side toward the image, the third lens may be a bi-convex lens, the fourth lens may be a bi-concave lens, and the fifth lens may be the bi-convex lens.

An aperture may be disposed between the second lens and the third lens.

The first lens through the fifth lens may be formed of optical glass.

The wide angle lenses may satisfy a condition of $$EPD \le 5 \text{ mm},$$

wherein EPD denotes an entrance pupil distance.

According to another aspect of the exemplary embodiments, there is provided a photographing apparatus including: the wide angle lenses; and an image capturing device which receives light formed by the wide angle lenses.

BRIEF DESCRIPTION OF THE DRAWINGS

The above and other features and advantages of the exemplary embodiments will become more apparent by describing in detail exemplary embodiments thereof with reference to the attached drawings in which:

FIGS. 7A and 7B respectively show longitudinal spherical aberration, astigmatism, and distortion of the wide angle lenses with respect to an infinite object distance and a shortest object distance according to the third embodiment;

DETAILED DESCRIPTION OF THE EXEMPLARY EMBODIMENTS

Figure 1A:
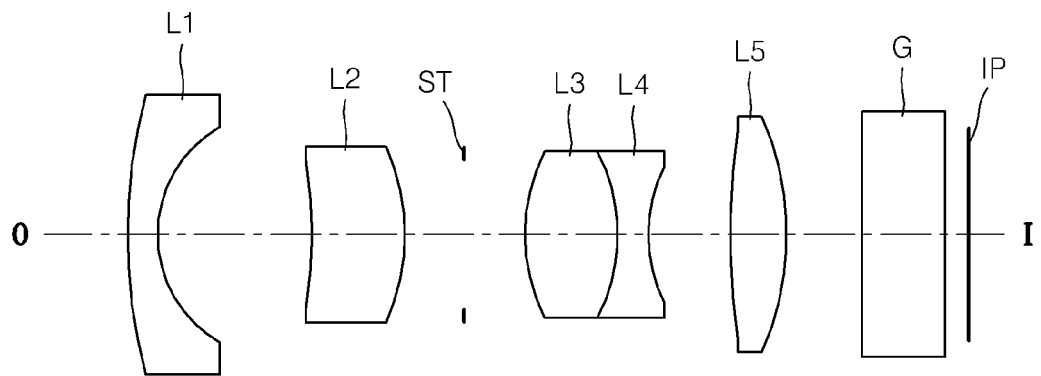
FIGS. 1A, 1B and 1C are diagrams of an optical arrangement of wide angle lenses with respect to object distances according to embodiments of the present invention.

Hereinafter, the exemplary embodiments will be described in detail by explaining exemplary embodiments with reference to the attached drawings. In the drawings, like reference numerals in the drawings denote like elements, and the size of each component may be exaggerated for clarity.

Figure 1B:
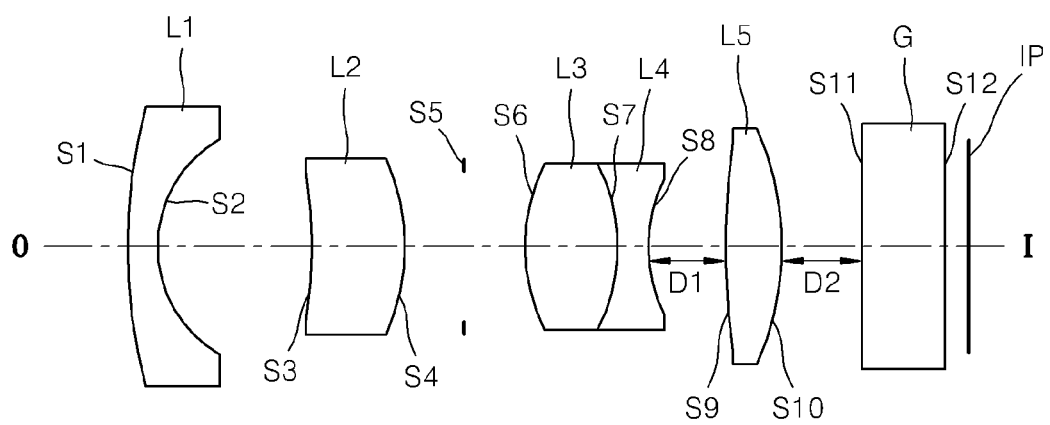
Figure 1C:
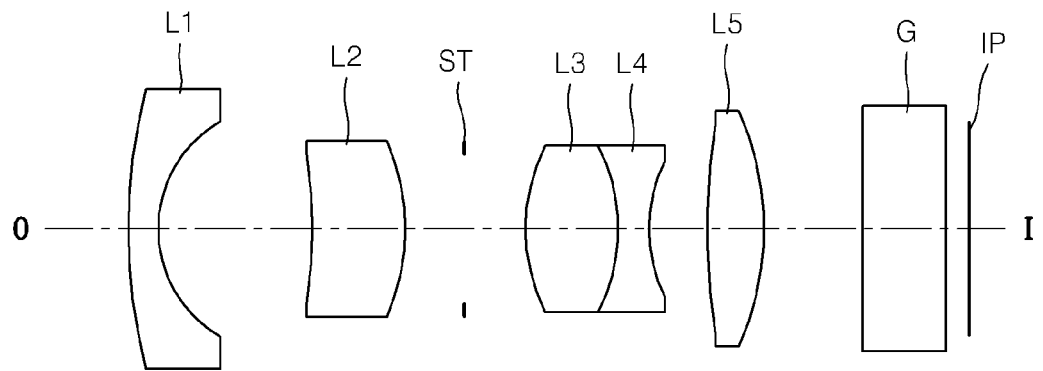

FIGS. 1A, 1B and 1C are diagrams of an optical arrangement of wide angle lenses with respect to object distances according to embodiments.

Referring to FIGS. 1A, 1B, and 1C, the wide angle lenses include a first lens L1 having negative refractive power, a second lens L2 having positive refractive power, a third lens L3 having positive refractive power, a fourth lens L4 having negative refractive power, and a fifth lens L5 having positive refractive power in an order from an object O to an image I.

Also, an aperture ST is disposed between the second lens L2 and the third lens L3, and an optical block G is disposed between the fifth lens L5 and an image plane IP.

The first lens L1 has negative refractive power, and a meniscus shape with a convex surface on a side toward the object O, near an optical axis. The second lens L2 has a meniscus shape having a convex surface on a side toward the image I and positive refractive power.

The first lens L1 and the second lens L2 may be formed of optical glass.

The third lens L3 has positive refractive power, and a bi-convex shape near the optical axis. The fourth lens L4 has negative refractive power, and a bi-concave shape near the optical axis.

The third lens L3 and the fourth lens L4 may be cemented lenses, and are configured for miniaturization, reducing sensitivity between lenses, and chromatic aberration compensation.

The third lens L3 and the fourth lens L4 may be formed of optical glass.

The fifth lens L5 has positive refractive power, and a bi-convex shape near the optical axis. The fifth lens L5 may be formed of optical glass.

At least one surface of the fifth lens L5 is an aspheric surface, thereby controlling aberration occurring on an off-axis.

FIGS. 1A, 1B, and 1C show optical arrangements of wide angle lenses with respect to an infinite object distance, a middle object distance, and a shortest object distance, respectively.

Referring to FIGS. 1A, 1B, and 1C, the fifth lens L5 is only moved in an optical axis direction to perform focusing from the infinite object distance to the shortest object distance. Accordingly, a variation in the image plane IP may be compensated for.

When focusing is performed from the infinite object distance to the shortest object distance, a distance D1 between the fourth lens L4 and the fifth lens L5 is reduced, and a distance D2 between the fifth lens L5 and the image plane IP increases.

The optical block G may be disposed between the fifth lens L5 and the image plane IP. The optical block may be an optical filter, such as a low pass filter (LPF), or an infrared ray (IR) cut filter or cover glass (CG) for protecting an image capturing surface of an image capturing device.

The wide angle lenses according to the present embodiment may use five lenses to ensure wide viewing angles, and facilitates excellent short distance photographing performance. Also, focusing is performed by moving the fifth lens L5 only in the optical axis direction, thereby promoting a lightweight focusing group.

The wide angle lenses according to the exemplary embodiments may satisfy Condition 1 below:

$$0.2 < f/BFL_{14} < 0.25 \qquad \text{[Condition 1]}$$

In this regard, f denotes an overall effective focal length of wide angle lenses and $BFL_{14}$ denotes a combined back focal length of the first through fourth lenses L1, L2, L3, and L4.

Condition 1 represents an appropriate range of a ratio of the overall effective focal length with respect to the combined back focal length of the first through fourth lenses L1, L2, L3, and L4. Condition 1 is a conditional expression to uniformly realize miniaturization of lenses and compensation of short distance aberration.

In Condition 1 above, in a case where the ratio is below a lower limit, an overall length of an optical system increases, which makes it difficult to achieve miniaturization. In a case where the ratio exceeds an upper limit, aberration increases with respect to a short distance, which deteriorates optical performance and makes it difficult to perform short distance focusing.

The wide angle lenses according to the exemplary embodiments may satisfy Condition 2 below:

$$3.0 < f_{14}/f \qquad \text{[Condition 2]}$$

In this regard, $f_{14}$ denotes a combined focal length of the first through fourth lenses L1, L2, L3, and L4.

Condition 2 represents an appropriate range of a ratio between the combined focal length of the first through fourth lenses L1, L2, L3, and L4 with respect to an overall length. In Condition 2, in a case where the ratio is below a lower limit, aberration increases with respect to a short distance, optical performance deteriorates, and it is difficult to perform focusing by only moving the fifth lens L5.

The wide angle lenses according to the exemplary embodiments may satisfy Conditions 3 and 4 below:

$$M_5 < 0.3 \qquad \text{[Condition 3]}$$

$$Nd_5 > 1.8 \qquad \text{[Condition 4]}$$

In this regard, $M_5$ denotes a magnification of the fifth lens L5, and $Nd_5$ denotes a refractive index of the fifth lens L5.

Condition 3 is a conditional expression to minimize aberration variation due to a movement of the fifth lens L5. Condition 4 is a conditional expression to minimize a focusing movement distance with respect to an object distance.

In other words, in Condition 3, in a case where the magnification $M_5$ exceeds an upper limit, it is difficult to control aberration variation due to a movement of the fifth lens L5. In Equation 4, in a case where the refractive index $Nd_5$ is below a lower limit, a movement distance of the fifth lens L5 with respect to the object distance increases, which makes it difficult to achieve miniaturization.

The wide angle lenses according to the exemplary embodiments may satisfy Condition 5 below:

$$EPD \leq 5 \text{ mm} \qquad \text{[Condition 5]}$$

In this regard, EPD denotes an entrance pupil distance.

Condition 5 is a conditional expression to allow the wide angle lenses of the exemplary embodiments to correspond to a microscope, without hiding a screen. In Condition 5, in a case where the EPD exceeds an upper limit, the entrance pupil distance increases, which may cause a problem in which the screen is partially hidden when applied to a general microscope.

The wide angle lenses of the exemplary embodiments that satisfy the above conditions may have wide viewing angles. Further, the wide angle lenses of the exemplary embodiments may facilitate excellent short distance photographing performance, and promote a lightweight focusing group.

The construction of the wide angle lenses of the exemplary embodiments will be described in more detail, with reference to specific lens data according to embodiments below.

An aspheric surface ASP, described throughout the embodiments of the exemplary embodiments, is defined according to an Equation below:

$$z = \frac{ch^2}{1+\sqrt{1-(1+K)c^2h^2}} + Ah^4 + Bh^6 + Ch^8 + Dh^{10} \quad \text{[Equation]}$$

In this regard, z denotes a distance from a peak of a lens in the optical axis direction, h denotes a distance from the optical axis in the direction perpendicular to the optical axis direction, K denotes a conic constant, A, B, C, and D each denote an aspheric coefficient, and c denotes an inverse number (1/R) of a radius of curvature at the peak of the lens.

In the lens data, R denotes a radius [mm] of a curvature of each lens surface (however, a surface having ∞ as a value of R indicates a planar surface), D denotes an interval between lens surfaces in the optical axis direction, Nd denotes a refractive index of each lens, and Vd denotes an Abbe number of each lens.

Furthermore, an effective focal length (EFL) denotes an overall EFL [mm] of wide angle lenses, Fno denotes an F-number, 2ω denotes an angle of view [°], and D1 and D2 denote variable distances [mm] between the fourth lens L4 and the fifth lens L5 and between the fifth lens L5 and the optical block G, respectively.

Furthermore, reference numeral Si of FIG. 1B indicates an ith surface, when a surface of the first lens L1 on a side toward the object O is a first surface S1 and a surface number increases in a direction toward the image plane IP. A reference numeral of each lens surface of FIG. 1B also applies to embodiments described with reference to FIGS. 2, 4, 6, 8, and 10.

First Embodiment

Figure 2:
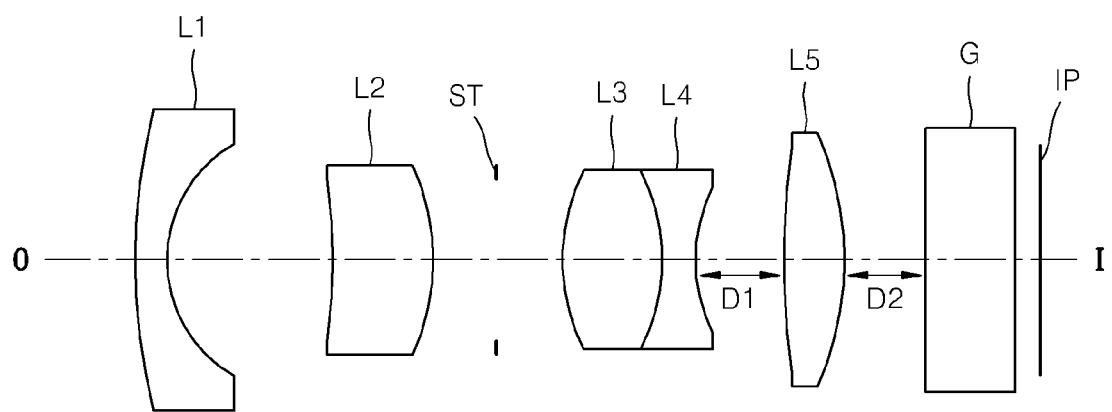
FIG. 2 is a diagram of an optical arrangement of wide angle lenses according to a first embodiment.

FIG. 2 is a diagram of an optical arrangement of wide angle lenses according to a first embodiment. The wide angle lenses of the present embodiment include the first lens L1 having negative refractive power, the second lens L2 having positive refractive power, the third lens L3 having positive refractive power, the fourth lens L4 having negative refractive power, and the fifth lens L5 having positive refractive power. The aperture ST is disposed between the second lens L2 and the third lens L3, and the optical block G is disposed between the fifth lens L5 and the image plane IP.

Table 1 below shows an EFL, a F-number (Fno), the angle of view 2ω, and the variation distances D1 and D2 between lenses in an infinite object distance (∞), middle object distances (380 mm and 180 mm), and a shortest distance object distance (30 mm) of the first embodiment.

TABLE 1

|  | ∞ | 380 mm | 180 mm | 30 mm |
|---|---|---|---|---|
| EFL | 5.0797 | 5.0672 | 5.0537 | 4.9475 |
| Fno | 2.0987 | 2.0984 | 2.1022 | 2.1512 |

TABLE 1-continued

|  | ∞ | 380 mm | 180 mm | 30 mm |
|---|---|---|---|---|
| 2ω | 68.5664 | 68.7442 | 68.9240 | 69.8964 |
| D1 | 2.6190 | 2.5490 | 2.4740 | 1.8660 |
| D2 | 2.4210 | 2.4910 | 2.5660 | 3.1740 |

Table 2 below shows design data of the first embodiment.

TABLE 2

| Surface No. | R | D | Nd | Vd |
|---|---|---|---|---|
| S1 | 18.191 | 1.00 | 1.620409 | 60.3438 |
| S2 | 4.039 | 5.00 | | |
| S3 | −15.623 | 3.00 | 1.806099 | 33.2694 |
| S4 | −7.036 | 1.90 | | |
| S5(ST) | ∞ | 2.00 | | |
| S6 | 5.869 | 3.00 | 1.785897 | 43.9344 |
| S7 | −5.344 | 1.05 | 1.846663 | 23.7848 |
| S8 | 15.075 | D1 | | |
| S9* | −9.158 | 1.85 | 1.806100 | 40.7000 |
| S10 | ∞ | D2 | | |
| S11 | ∞ | 2.69 | 1.516798 | 64.1983 |
| S12 | ∞ | 0.80 | | |

In Table 2 above, * denotes an aspheric surface. Table 3 below shows an aspheric surface coefficient of the first embodiment. E−m (where m is an integral) in a value of the aspheric surface coefficient denotes×10−m.

TABLE 3

| Surface No. | Aspheric surface coefficient | | | |
|---|---|---|---|---|
| | K | A | B | C |
| S9 | 0.00E+00 | −9.4089E−004 | 4.7756E−006 | −6.9377E−007 |

Figure 3A:
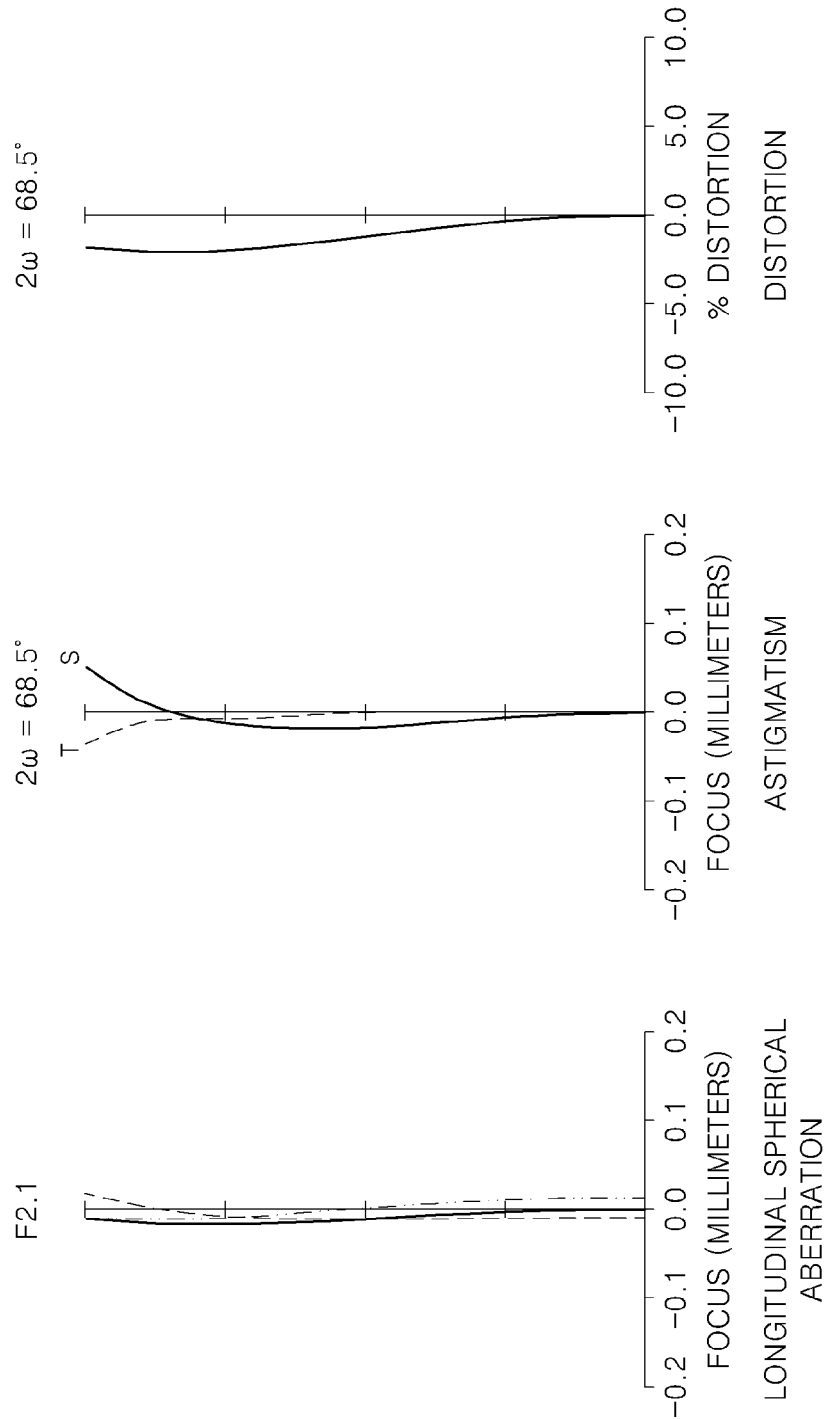
FIGS. 3A and 3B respectively show longitudinal spherical aberration, astigmatism, and distortion of the wide angle lenses with respect to an infinite object distance and a shortest object distance according to a first embodiment.
Figure 3B:
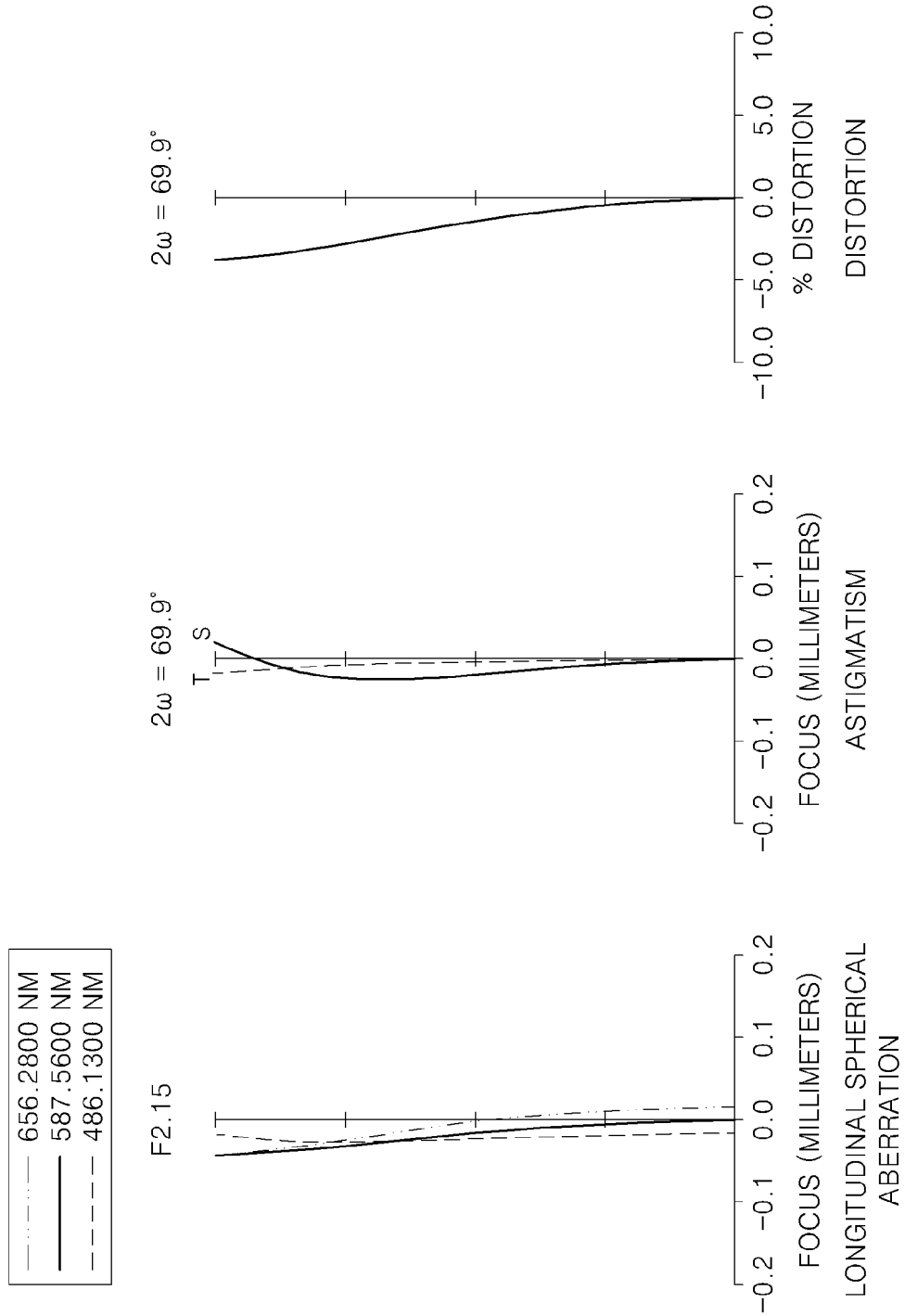

FIGS. 3A and 3B respectively show longitudinal spherical aberration, astigmatism, and distortion of the wide angle lenses with respect to an infinite object distance and a shortest object distance, according to the first embodiment.

The longitudinal spherical aberration shows aberration in wavelengths 656.28 nm (line C), 587.56 nm (line d), and 486.13 nm (line F). In regard to the astigmatism, a solid line indicates aberration in the 587.56 nm (line d) on a sagittal surface and a dotted line indicates aberration in the 587.56 nm (line d) on a tangential surface. The distortion shows distortion in the 587.56 nm (line d).

Second Embodiment

Figure 4:
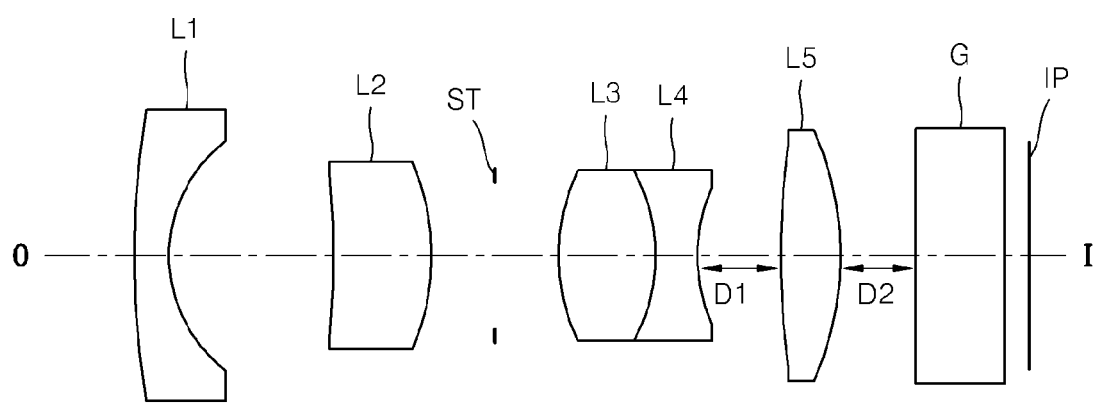
FIG. 4 is a diagram of an optical arrangement of wide angle lenses according to a second embodiment.

FIG. 4 is a diagram of an optical arrangement of wide angle lenses according to a second embodiment. The wide angle lenses of the present embodiment include the first lens L1 having negative refractive power, the second lens L2 having positive refractive power, the third lens L3 having positive refractive power, the fourth lens L4 having negative refractive power, and the fifth lens L5 having positive refractive power. The aperture ST is disposed between the second lens L2 and the third lens L3, and the optical block G is disposed between the fifth lens L5 and the image plane IP.

Table 4 below shows an EFL, a F-number (Fno), the angle of view 2ω, and the variation distances D1 and D2 between lenses in an infinite object distance (∞), middle object distances (380 mm and 180 mm), and a shortest distance object distance (30 mm) of the second embodiment.

TABLE 4

|  | ∞ | 380 mm | 180 mm | 35 mm |
|---|---|---|---|---|
| EFL | 5.0863 | 5.0734 | 5.0600 | 4.9682 |
| Fno | 2.0956 | 2.0985 | 2.1017 | 2.1395 |
| 2ω | 68.6094 | 68.7946 | 68.9772 | 69.9116 |
| D1 | 2.5950 | 2.5240 | 2.4500 | 1.9330 |
| D2 | 2.4250 | 2.4960 | 2.5700 | 3.0870 |

Table 5 below shows design data of the first embodiment.

TABLE 5

| Surface No. | R | D | Nd | Vd |
|---|---|---|---|---|
| S1 | 32.158 | 1.08 | 1.620409 | 60.3438 |
| S2 | 4.365 | 5.12 | | |
| S3 | −21.080 | 3.00 | 1.806099 | 33.2694 |
| S4 | −7.572 | 2.00 | | |
| S5(ST) | ∞ | 2.00 | | |
| S6 | 6.095 | 3.00 | 1.785897 | 43.9344 |
| S7 | −5.483 | 1.31 | 1.846663 | 23.7848 |
| S8 | 5.483 | D1 | | |
| S9* | 16.043 | 1.83 | 1.806100 | 40.7000 |
| S10 | −8.821 | D2 | | |
| S11 | ∞ | 2.69 | 1.516798 | 64.1983 |
| S12 | ∞ | 2.00 | | |

In Table 5 above, * denotes an aspheric surface. Table 6 below shows an aspheric surface coefficient of the second embodiment.

TABLE 6

| Surface No. | Aspheric surface coefficient | | | |
|---|---|---|---|---|
| | K | A | B | C |
| S9 | 0.00E+00 | −9.6812E−004 | 4.5907E−006 | −6.9082E−007 |

Figure 5A:
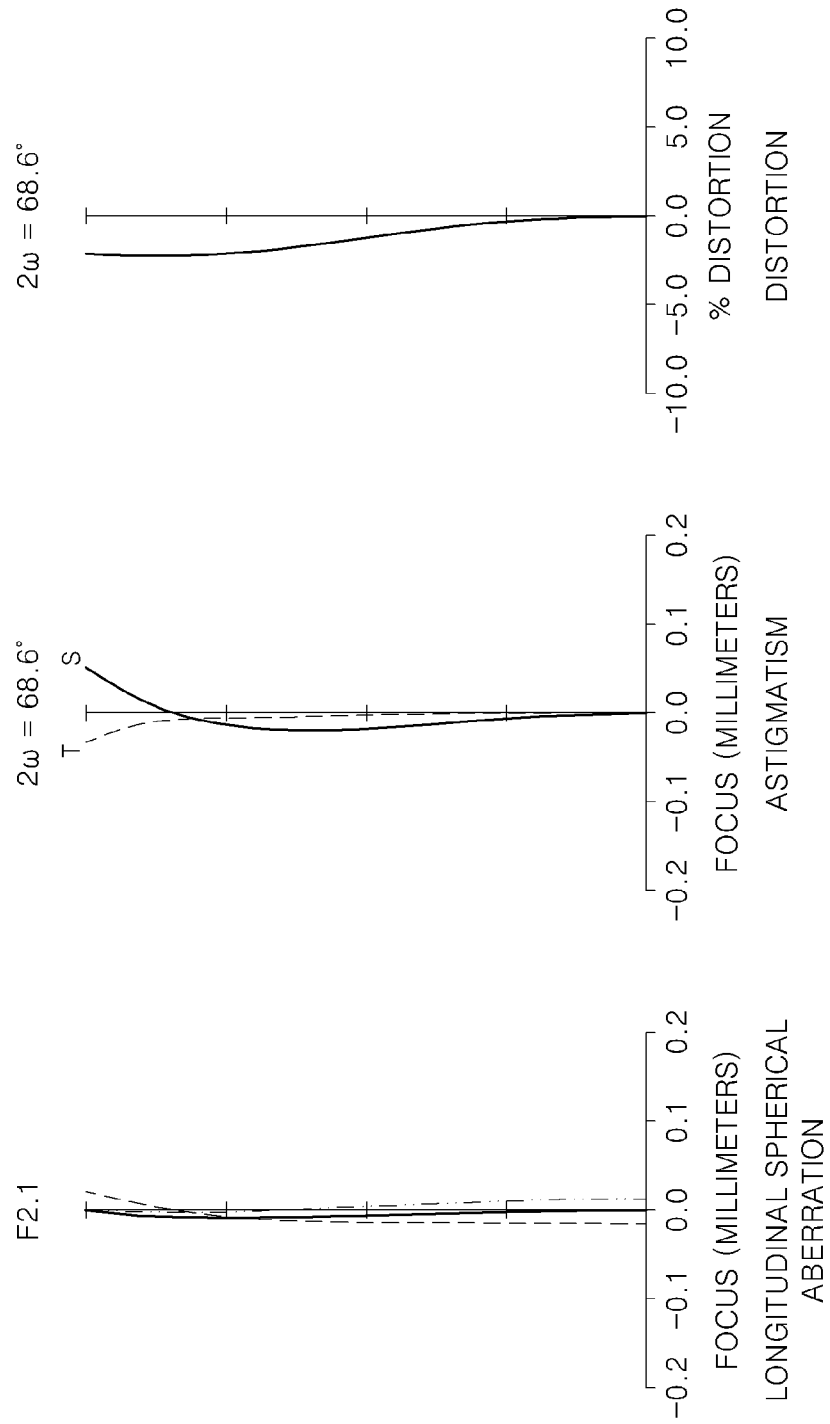
FIGS. 5A and 5B respectively show longitudinal spherical aberration, astigmatism, and distortion of the wide angle lenses with respect to an infinite object distance and a shortest object distance according to the second embodiment.
Figure 5B:
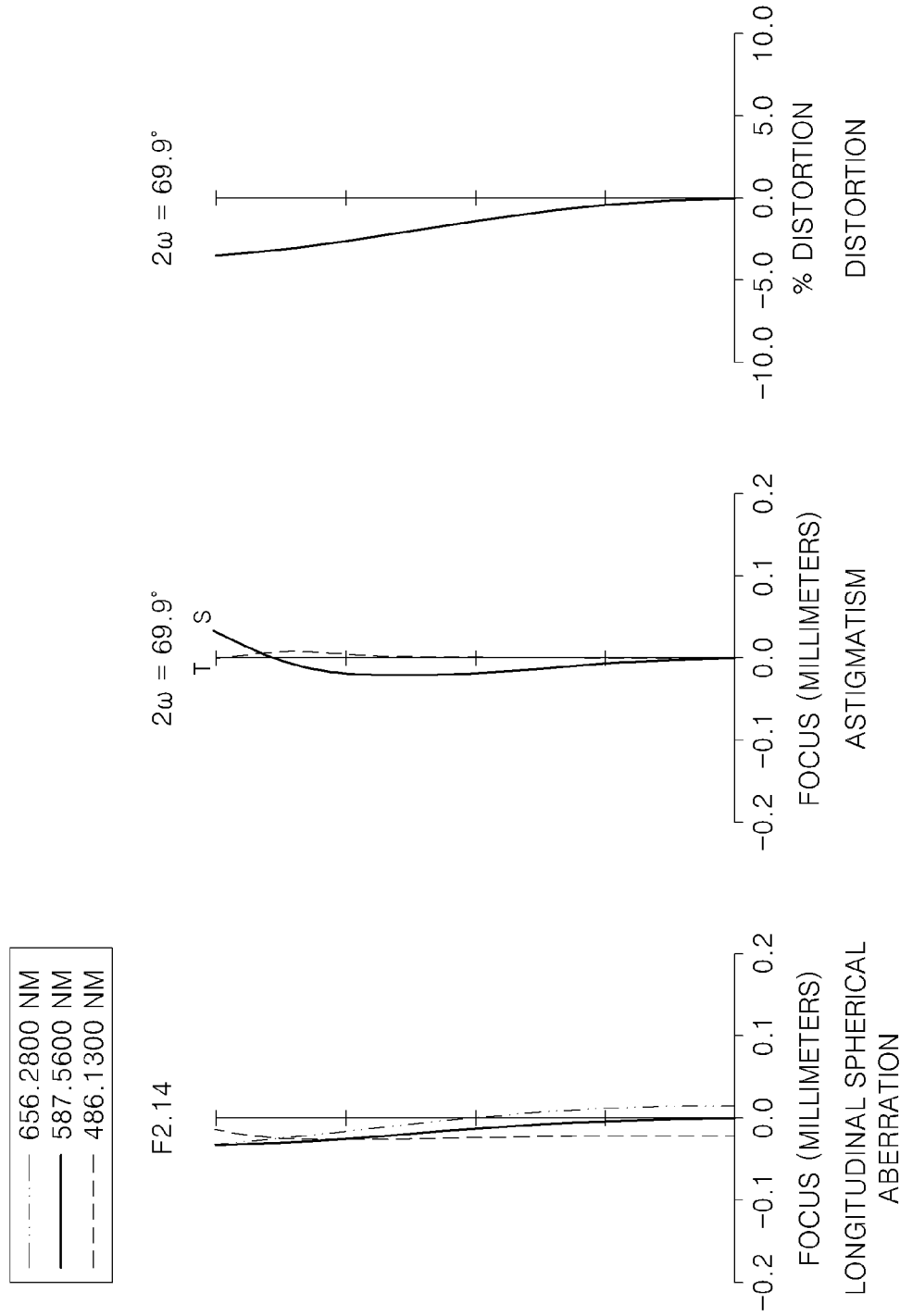

FIGS. 5A and 5B respectively show longitudinal spherical aberration, astigmatism, and distortion of the wide angle lenses with respect to an infinite object distance and a shortest object distance according to the second embodiment.

The longitudinal spherical aberration shows aberration in wavelengths 656.28 nm (line C), 587.56 nm (line d), and 486.13 nm (line F). In regard to the astigmatism, a solid line indicates aberration in the 587.56 nm (line d) on a sagittal surface and a dotted line indicates aberration in the 587.56 nm (line d) on a tangential surface. The distortion shows distortion in the 587.56 nm (line d).

Third Embodiment

Figure 6:
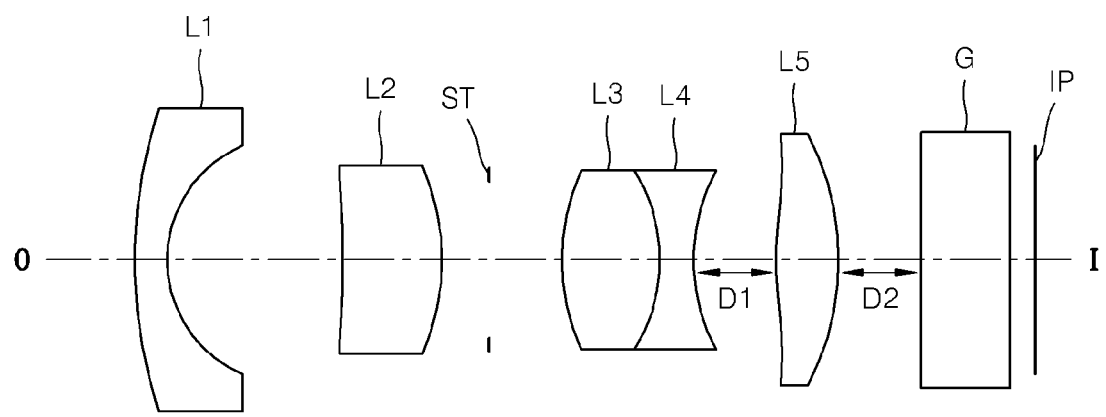
FIG. 6 is a diagram of an optical arrangement of wide angle lenses according to a third embodiment.

FIG. 6 is a diagram of an optical arrangement of wide angle lenses according to a third embodiment. The wide angle lenses of the present embodiment include the first lens L1 having negative refractive power, the second lens L2 having positive refractive power, the third lens L3 having positive refractive power, the fourth lens L4 having negative refractive power, and the fifth lens L5 having positive refractive power. The aperture ST is disposed between the second lens L2 and the third lens L3, and the optical block G is disposed between the fifth lens L5 and the image plane IP.

Table 7 below shows an EFL, a F-number (Fno), the angle of view 2ω, and the variation distances D1 and D2 between lenses in an infinite object distance (∞), middle object distances (380 mm and 180 mm), and a shortest distance object distance (30 mm) of the third embodiment.

TABLE 7

|  | ∞ | 380 mm | 180 mm | 35 mm |
|---|---|---|---|---|
| EFL | 5.0860 | 5.0725 | 5.0581 | 4.9602 |
| Fno | 2.1050 | 2.1010 | 2.1045 | 2.1408 |
| 2ω | 69.0232 | 69.1978 | 69.3760 | 70.2998 |
| D1 | 2.5830 | 2.5130 | 2.4380 | 1.9150 |
| D2 | 2.5670 | 2.6370 | 2.7120 | 3.2350 |

Table 8 below shows design data of the third embodiment.

TABLE 8

| Surface No. | R | D | Nd | Vd |
|---|---|---|---|---|
| S1 | 15.3499 | 1.00 | 1.620409 | 60.3438 |
| S2 | 3.8407 | 5.42 | | |
| S3 | −14.4219 | 3.00 | 1.783389 | 34.5083 |
| S4 | −6.6843 | 1.46 | | |
| S5(ST) | ∞ | 2.23 | | |
| S6 | 5.6787 | 3.00 | 1.751834 | 44.0452 |
| S7 | −5.0639 | 1.05 | 1.846663 | 23.7848 |
| S8 | 5.6909 | D1 | | |
| S9* | 21.5155 | 1.85 | 1.806100 | 40.7000 |
| S10 | −8.3784 | D2 | | |
| S11 | ∞ | 2.69 | 1.516798 | 64.1983 |
| S12 | ∞ | 0.80 | | |

In Table 8 above, * denotes an aspheric surface. Table 9 below shows an aspheric surface coefficient of the third embodiment.

TABLE 9

| Surface No. | Aspheric surface coefficient | | | |
|---|---|---|---|---|
| | K | A | B | C |
| S9 | 0.00E+00 | −9.7212E−004 | 3.1405E−006 | −8.6825E−007 |

Figure 7A:
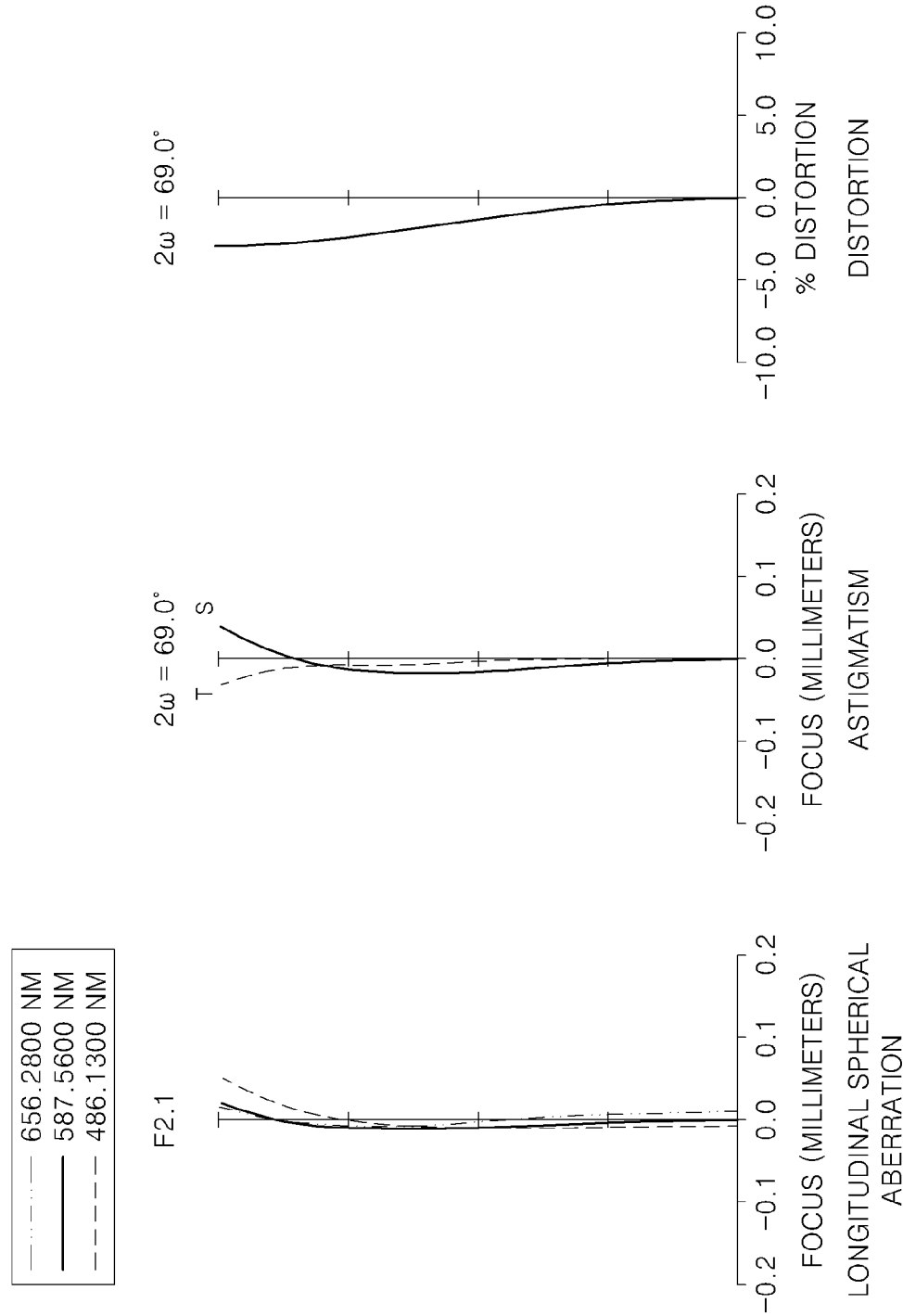

FIGS. 7A and 7B respectively show longitudinal spherical aberration, astigmatism, and distortion of the wide angle lenses with respect to an infinite object distance and a shortest object distance according to the third embodiment.

The longitudinal spherical aberration shows aberration in wavelengths 656.28 nm (line C), 587.56 nm (line d), and 486.13 nm (line F). In regard to the astigmatism, a solid line indicates aberration in the 587.56 nm (line d) on a sagittal surface and a dotted line indicates aberration in the 587.56 nm (line d) on a tangential surface. The distortion shows distortion in the 587.56 nm (line d).

Fourth Embodiment

Figure 8:
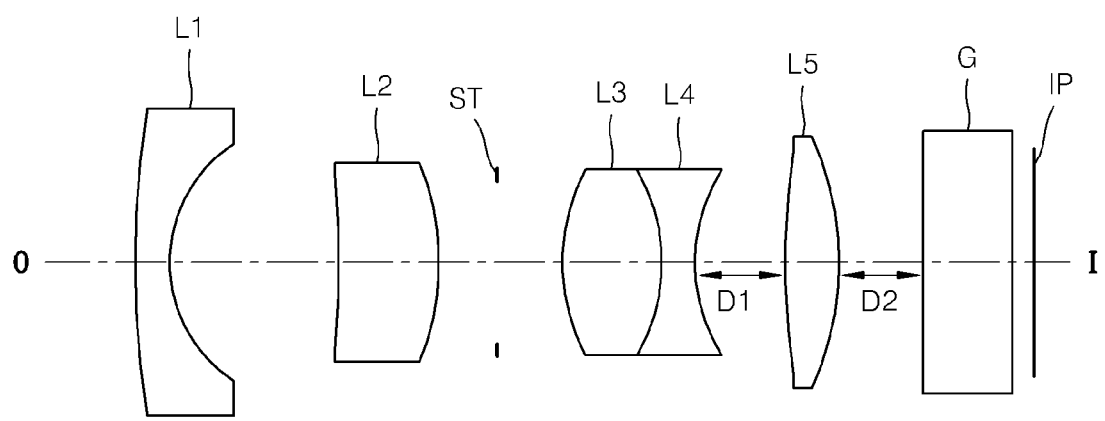
FIG. 8 is a diagram of an optical arrangement of wide angle lenses according to a fourth embodiment.

FIG. 8 is a diagram of an optical arrangement of wide angle lenses according to a fourth embodiment. The wide angle lenses of the present embodiment include the first lens L1 having negative refractive power, the second lens L2 having positive refractive power, the third lens L3 having positive refractive power, the fourth lens L4 having negative refractive power, and the fifth lens L5 having positive refractive power. The aperture ST is disposed between the second lens L2 and the third lens L3, and the optical block G is disposed between the fifth lens L5 and the image plane IP.

Table 10 below shows an EFL, a F-number (Fno), the angle of view 2ω, and the variation distances D1 and D2 between lenses in an infinite object distance (∞), middle object distances (380 mm and 180 mm), and a shortest distance object distance (30 mm) of the fourth embodiment.

TABLE 10

|  | ∞ | 380 mm | 180 mm | 35 mm |
|---|---|---|---|---|
| EFL | 5.0827 | 5.0700 | 5.0554 | 4.9635 |
| Fno | 2.0040 | 1.9964 | 1.9954 | 1.9906 |
| 2ω | 68.5750 | 68.7550 | 68.9498 | 69.8748 |
| D1 | 2.7082 | 2.6391 | 2.5601 | 2.0486 |
| D2 | 2.5606 | 2.6297 | 2.7088 | 3.2202 |

Table 11 below shows design data of the fourth embodiment.

TABLE 11

| Surface No. | R | D | Nd | Vd |
|---|---|---|---|---|
| S1 | 25.4431 | 1.0450 | 1.620409 | 60.3438 |
| S2 | 4.3436 | 5.1573 | | |
| S3 | −19.0046 | 3.0000 | 1.870422 | 32.8825 |
| S4 | −7.7741 | 1.7743 | | |
| S5(ST) | ∞ | 2.0000 | | |
| S6 | 5.9023 | 3.0000 | 1.785897 | 43.9344 |
| S7 | −5.3030 | 1.0209 | 1.846663 | 23.7848 |
| S8 | 5.3373 | D1 | | |
| S9* | 15.4371 | 1.6291 | 1.806100 | 40.7000 |
| S10 | −9.0678 | D2 | | |
| S11 | ∞ | 2.6900 | 1.516798 | 64.1983 |
| S12 | ∞ | 0.6803 | | |

In Table 11 above, * denotes an aspheric surface. Table 12 below shows an aspheric surface coefficient of the fourth embodiment.

TABLE 12

| Surface No. | Aspheric surface coefficient | | | |
|---|---|---|---|---|
| | K | A | B | C |
| S9 | 0.00E+00 | −9.4083E−004 | 4.6752E−006 | −6.2921E−007 |

Figure 9A:
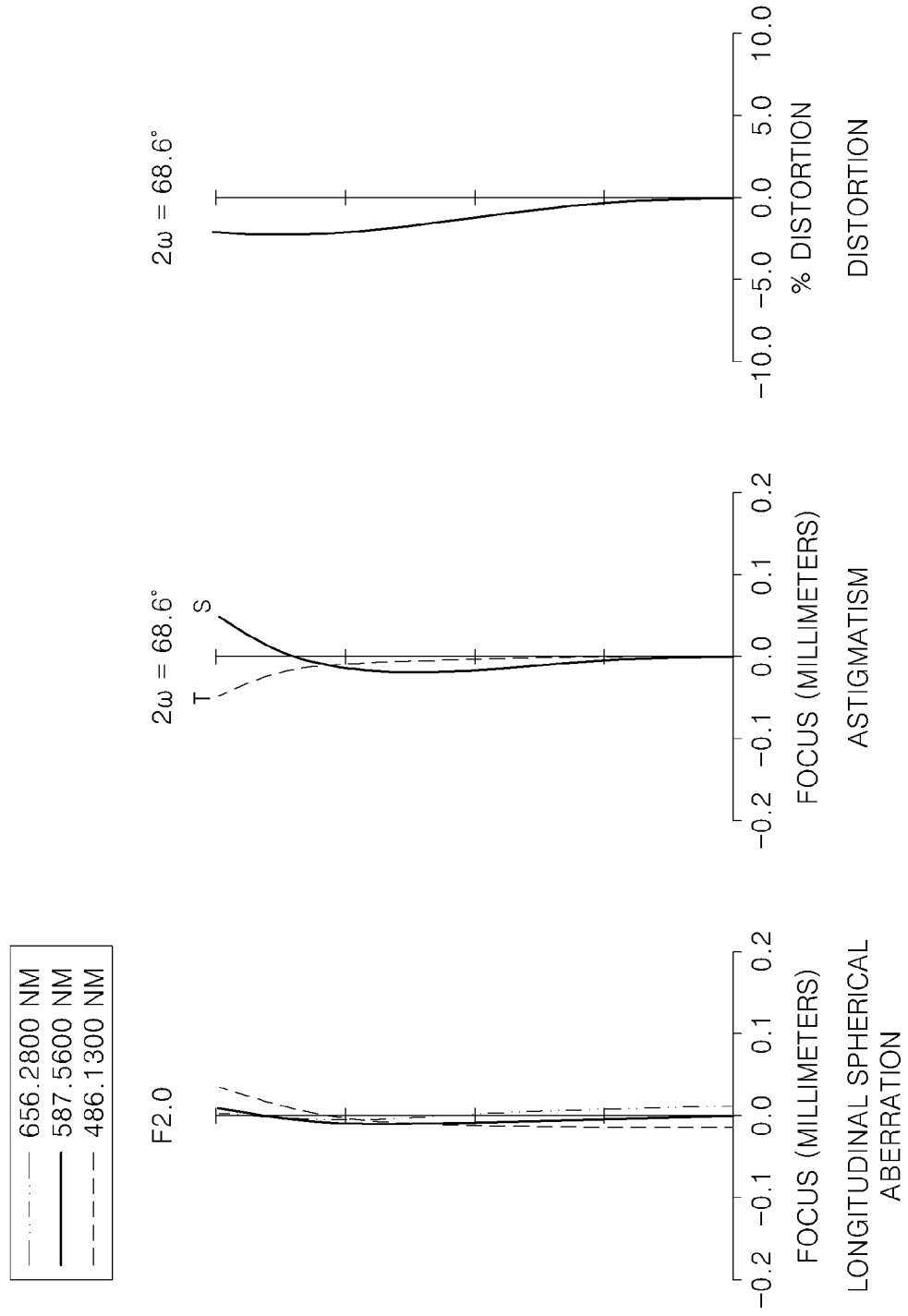
FIGS. 9A and 9B respectively show longitudinal spherical aberration, astigmatism, and distortion of the wide angle lenses with respect to an infinite object distance and a shortest object distance according to the fourth embodiment.
Figure 9B:
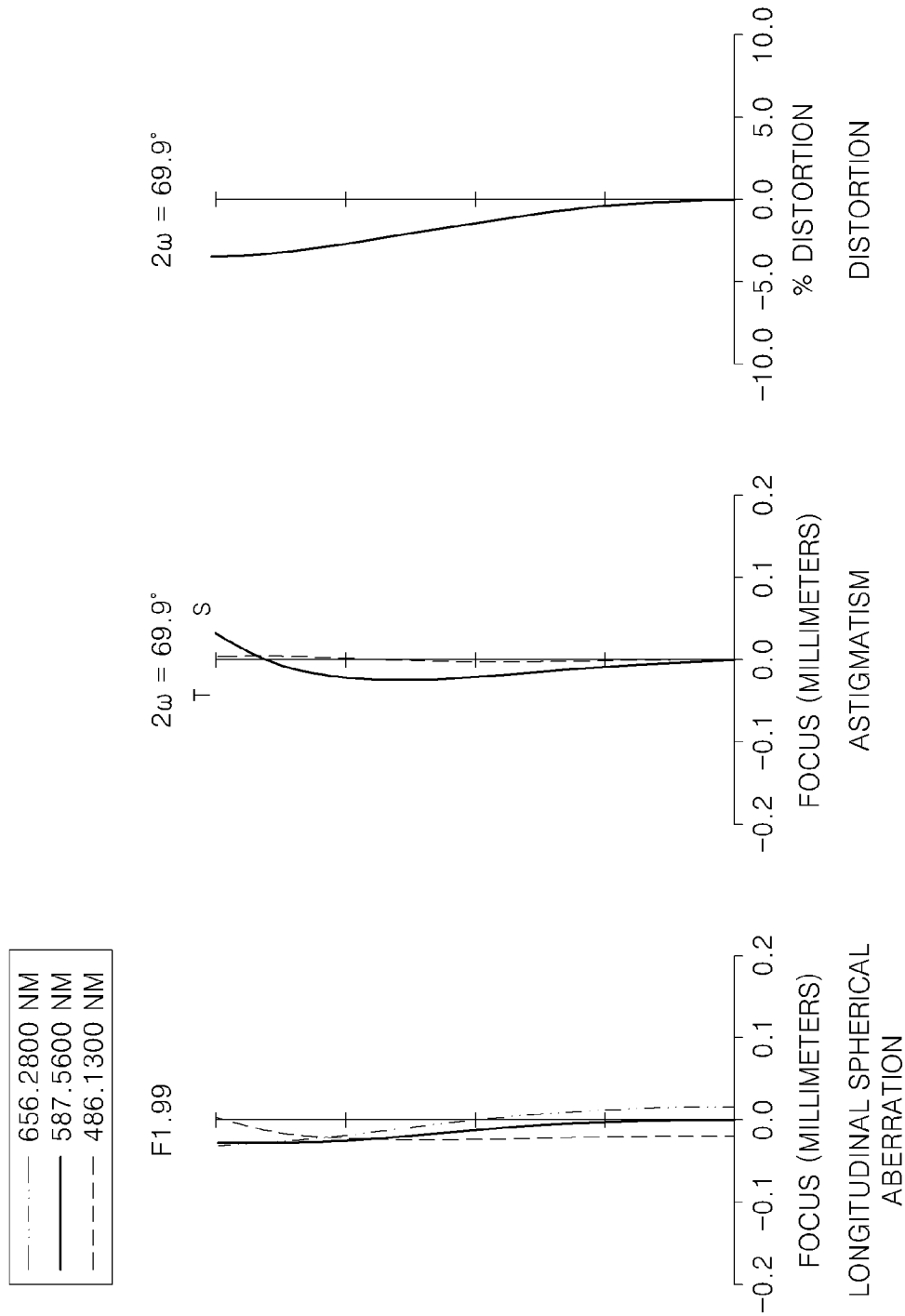

FIGS. 9A and 9B respectively show longitudinal spherical aberration, astigmatism, and distortion of the wide angle lenses with respect to an infinite object distance and a shortest object distance according to the fourth embodiment.

The longitudinal spherical aberration shows aberration in wavelengths 656.28 nm (line C), 587.56 nm (line d), and 486.13 nm (line F). In regard to the astigmatism, a solid line indicates aberration in the 587.56 nm (line d) on a sagittal surface and a dotted line indicates aberration in the 587.56 nm (line d) on a tangential surface. The distortion shows distortion in the 587.56 nm (line d).

Fifth Embodiment

Figure 10:
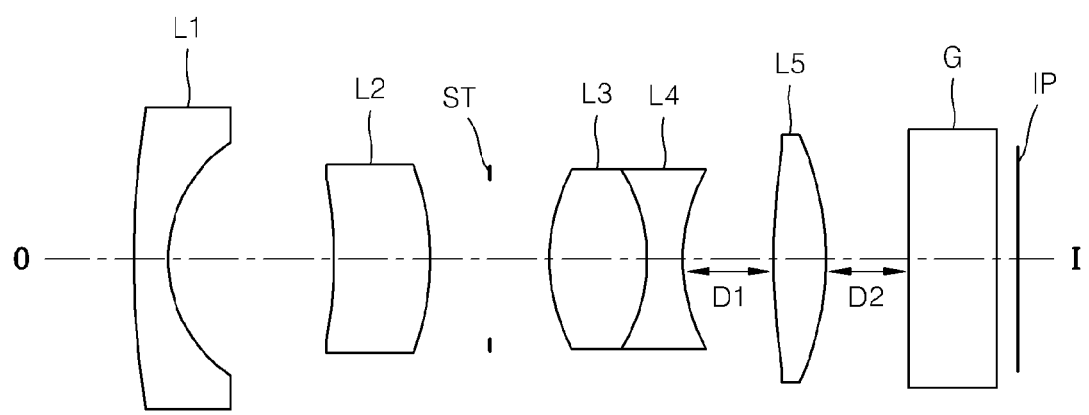
FIG. 10 is a diagram of an optical arrangement of wide angle lenses according to a fifth embodiment.

FIG. 10 is a diagram of an optical arrangement of wide angle lenses according to a fifth embodiment. The wide angle lenses of the present embodiment include the first lens L1 having negative refractive power, the second lens L2 having positive refractive power, the third lens L3 having positive refractive power, the fourth lens L4 having negative refractive power, and the fifth lens L5 having positive refractive power. The aperture ST is disposed between the second lens L2 and the third lens L3, and the optical block G is disposed between the fifth lens L5 and the image plane IP.

Table 13 below shows an EFL, a F-number (Fno), the angle of view 2ω, and the variation distances D1 and D2 between lenses in an infinite object distance (∞), middle object distances (380 mm and 180 mm), and a shortest distance object distance (30 mm) of the fifth embodiment.

TABLE 13

|  | ∞ | 380 mm | 180 mm | 35 mm |
|---|---|---|---|---|
| EFL | 5.0838 | 5.0701 | 5.0553 | 4.9600 |
| Fno | 2.0043 | 1.9965 | 1.9953 | 1.9886 |
| 2ω | 68.7184 | 68.9196 | 69.1268 | 70.1886 |
| D1 | 2.7886 | 2.7171 | 2.6399 | 2.1300 |
| D2 | 2.5587 | 2.6301 | 2.7073 | 3.2172 |

Table 14 below shows design data of the fifth embodiment.

TABLE 14

| Surface No. | R | D | Nd | Vd |
|---|---|---|---|---|
| S1 | 24.9328 | 1.1351 | 1.620409 | 60.3438 |
| S2 | 4.3139 | 5.0898 | | |
| S3 | −17.6177 | 3.0000 | 1.903658 | 31.3150 |
| S4 | −7.8336 | 1.6705 | | |
| S5(ST) | ∞ | 2.0000 | | |
| S6 | 6.1557 | 3.0000 | 1.794497 | 45.3864 |
| S7 | −5.6633 | 1.1211 | 1.846663 | 23.7848 |
| S8 | 5.6633 | D1 | | |
| S9* | 15.2135 | 1.5964 | 1.806100 | 40.7000 |
| S10 | −9.5495 | D2 | | |
| S11 | ∞ | 2.6900 | 1.516798 | 64.1983 |
| S12 | ∞ | 0.6800 | | |

In Table 14 above, * denotes an aspheric surface. Table 15 below shows an aspheric surface coefficient of the fifth embodiment.

TABLE 15

| Surface No. | Aspheric surface coefficient | | | |
|---|---|---|---|---|
| | K | A | B | C |
| S9 | 0.00+00 | −9.3248E−004 | 3.2907E−006 | −6.7606E−007 |

Figure 11A:
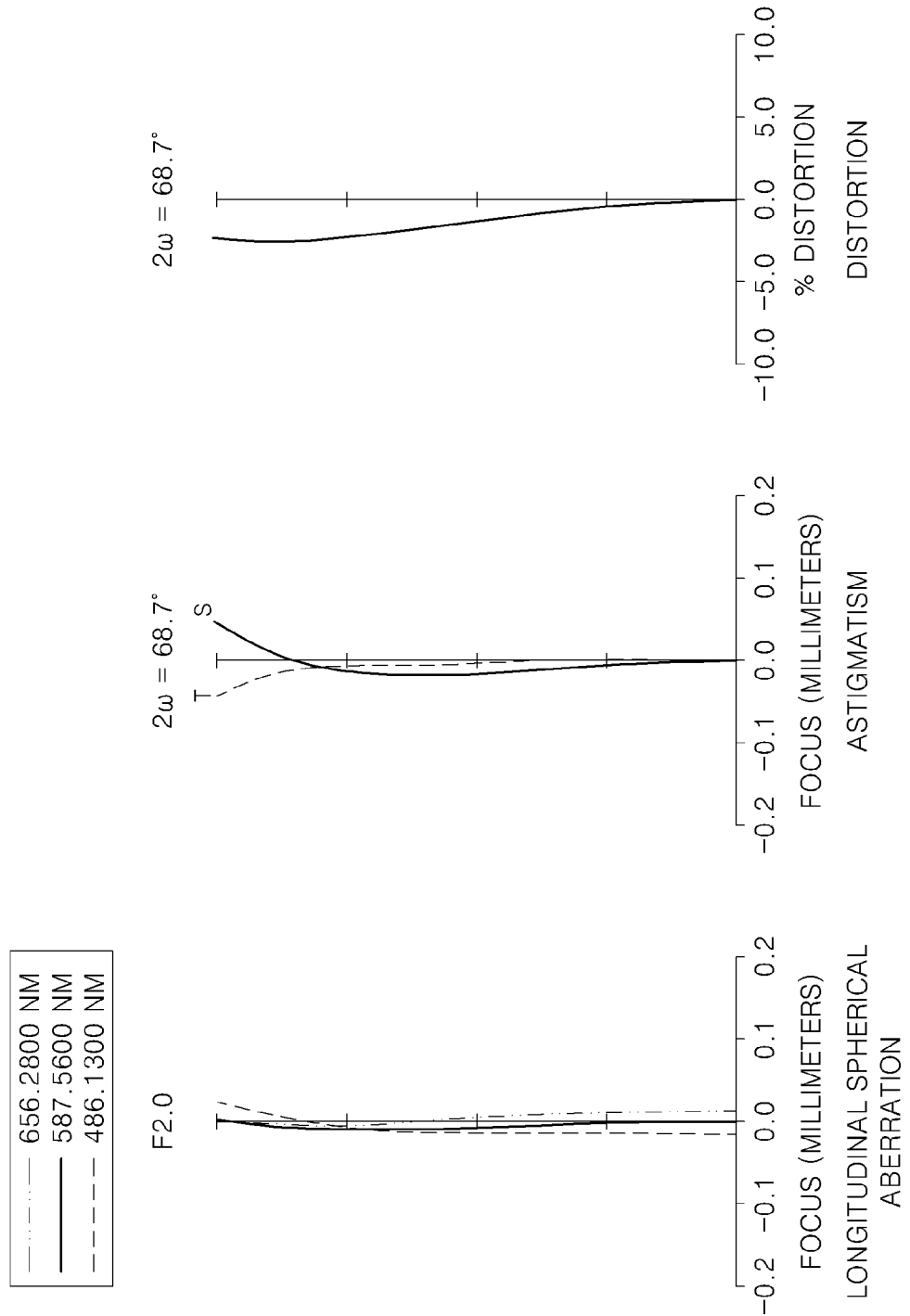
FIGS. 11A and 11B respectively show longitudinal spherical aberration, astigmatism, and distortion of the wide angle lenses with respect to an infinite object distance and a shortest object distance according to the fifth embodiment.
Figure 11B:
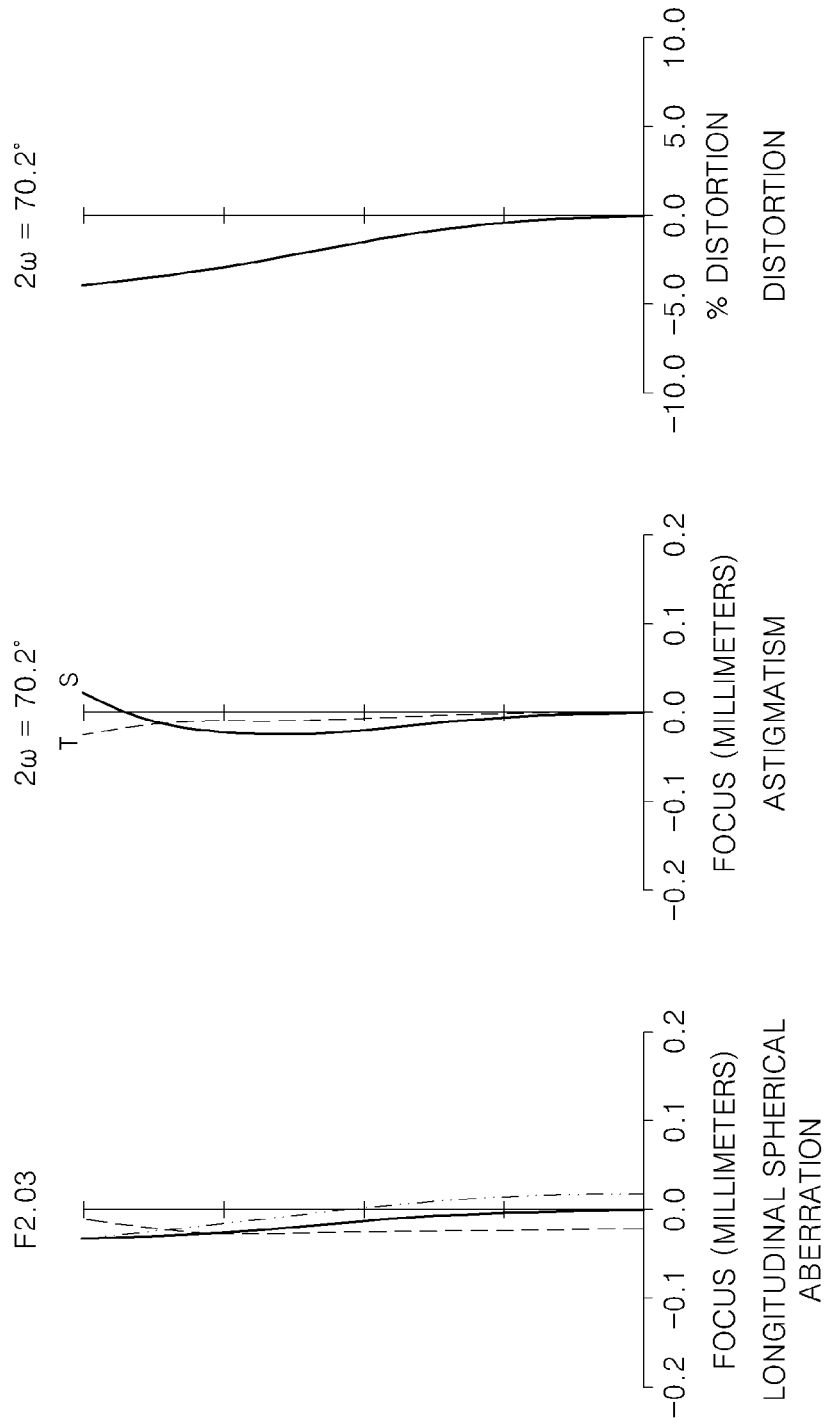

FIGS. 11A and 11B respectively show longitudinal spherical aberration, astigmatism, and distortion of the wide angle lenses with respect to an infinite object distance and a shortest object distance according to the fifth embodiment.

The longitudinal spherical aberration shows aberration in wavelengths 656.28 nm (line C), 587.56 nm (line d), and 486.13 nm (line F). In regard to the astigmatism, a solid line indicates aberration in the 587.56 nm (line d) on a sagittal surface and a dotted line indicates aberration in the 587.56 nm (line d) on a tangential surface. The distortion shows distortion in the 587.56 nm (line d).

Table 16 below shows that the above-described conditional expressions are satisfied in the first through fifth embodiments.

TABLE 16

|  | First Embodiment | Second ment | Third Embodiment | Fourth Embodiment | Fifth Embodiment |
|---|---|---|---|---|---|
| f/BFL$_{14}$ | 0.2116 | 0.2146 | 0.2375 | 0.2193 | 0.2298 |
| f$_{14}$/f | 3.8392 | 3.8040 | 3.3541 | 3.7359 | 3.5094 |
| M$_5$ | 0.2605 | 0.2629 | 0.2981 | 0.2677 | 0.2849 |
| Nd$_5$ | 1.8061 | 1.8061 | 1.8061 | 1.8061 | 1.8061 |
| EPD | 5.00 | 4.99 | 5.00 | 5.00 | 5.00 |

The wide angle lenses of the embodiments may be used in a photographing apparatus, such as a surveillance camera including an image capturing device (not shown), a digital camera, a video camera, a video presenter, a microscope, etc.

The image capturing device may be a solid image capturing device for receiving light via a wide angle lens, such as a charge-coupled device (CCD) or a complementary metal-oxide semiconductor (CMOS). An image capturing surface of the image capturing device corresponds to the image plane IP of the wide angle lens.

According to the above embodiments of the present invention, a wide angle lens is capable of having a small size and excellent short distance photographing performance, and a photographing apparatus including the wide angle lens may be provided.

Further, a rear focus wide angle lens, for promoting a lightweight focus group and a photographing apparatus including the rear focus wide angle lens, may be provided.

While the exemplary embodiments have been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. Wide angle lenses comprising:
   a first lens which has a negative refractive power;
   a second lens which has a positive refractive power;
   a third lens which has the positive refractive power;
   a fourth lens which has the negative refractive power; and
   a fifth lens which has the positive refractive power,
   wherein the first lens, the second lens, the third lens, the fourth lens, and the fifth lens are in an order from an object to an image,
   wherein the wide angle lenses satisfy a condition of $0.2 < f/BFL_{14} < 0.25$,
   wherein f denotes an overall effective focal length of the wide angle lenses and $BFL_{14}$ denotes a combined back focal length of the first lens through the fourth lens.

2. The wide angle lenses of claim 1, wherein the wide angle lenses satisfy a condition of $3.0 < f_{14}/f$,
   wherein $f_{14}$ denotes a combined focal length of the first lens through the fourth lens.

3. The wide angle lenses of claim 1, wherein the third lens and the fourth lens form a cemented lens.

4. The wide angle lenses of claim 1, wherein the first lens is a meniscus lens having a convex surface on a side toward the object, the second lens is the meniscus lens having the convex surface on a side toward the image, the third lens is a bi-convex lens, the fourth lens is a bi-concave lens, and the fifth lens is the bi-convex lens.

5. The wide angle lenses of claim 1, wherein an aperture is disposed between the second lens and the third lens.

6. The wide angle lenses of claim 1, wherein the first lens through the fifth lens are formed of optical glass.

7. The wide angle lenses of claim 1, wherein the wide angle lenses satisfy a condition of $EPD \leq 5$ mm,
   wherein EPD denotes an entrance pupil distance.

8. A photographing apparatus comprising:
   the wide angle lenses of claim 1; and
   an image capturing device which receives light formed by the wide angle lenses.

9. The wide angle lenses of claim 1, wherein focusing is performed by moving the fifth lens in an optical axis direction.

10. The wide angle lenses of claim 9, wherein the first lens through the fourth lens are fixed.

11. The wide angle lenses of claim 9, wherein the fifth lens satisfies a condition of $M_5 < 0.3$,
    wherein $M_5$ denotes a magnification of the fifth lens.

12. The wide angle lenses of claim 9, wherein the fifth lens satisfies a condition of $Nd_5 > 1.8$,
    wherein $Nd_5$ denotes a refractive index of the fifth lens.

13. The wide angle lenses of claim 9, wherein the fifth lens comprises at least one aspheric surface.

14. The wide angle lenses of claim 13, wherein a surface of the fifth lens, which is disposed on a side toward the object, is the at least one aspheric surface.

* * * * *